United States Patent [19]

Budrose

[11] 3,975,767

[45] Aug. 17, 1976

[54] COMBINATION CARD AND TAPE RECORDER

[76] Inventor: Charles R. Budrose, Box 1057, Saugus, Mass. 01906

[22] Filed: Sept. 5, 1974

[21] Appl. No.: 503,326

Related U.S. Application Data

[63] Continuation-in-part of Ser. No. 297,947, Oct. 16, 1972, Pat. No. 3,852,817, which is a continuation-in-part of Ser. No. 273,441, July 20, 1972, Pat. No. 3,860,961.

[52] U.S. Cl. .................................. 360/88; 360/93; 360/94
[51] Int. Cl.² .................. G11B 15/28; G11B 15/24
[58] Field of Search .............. 360/93, 88, 2, 94, 63, 360/61, 15; 35/35 C, 8 A; 226/109, 110

[56] References Cited
UNITED STATES PATENTS

| | | | |
|---|---|---|---|
| 3,142,909 | 8/1964 | Irazoqui | 360/91 |
| 3,454,731 | 7/1969 | Hori et al. | 360/61 |
| 3,805,288 | 4/1974 | Camras | 360/94 |
| 3,872,502 | 3/1975 | Wild | 360/2 |

*Primary Examiner*—Robert S. Tupper
*Attorney, Agent, or Firm*—Wolf, Greenfield & Sacks

[57] ABSTRACT

The record/play apparatus has a well for receiving a tape cassette or cartridge, means defining a card channel for a recording card, a switch array for controlling such functions as record, play and erase and a mode switch for selecting card or tape operation. The mode switch can operate to switch the erase and record/play circuits between cassette and card heads, or can operate in conjunction with a cam arrangement for providing selective drive for either the card or tape transports. The apparatus also has another mode of operation preferably selectable via the mode switch which permits interaction between the card and tape heads whereby a message can be transferred from the tape cassette to the card. In an alternate embodiment a separate card drive motor is provided for selective card drive.

9 Claims, 9 Drawing Figures

FIG. 9
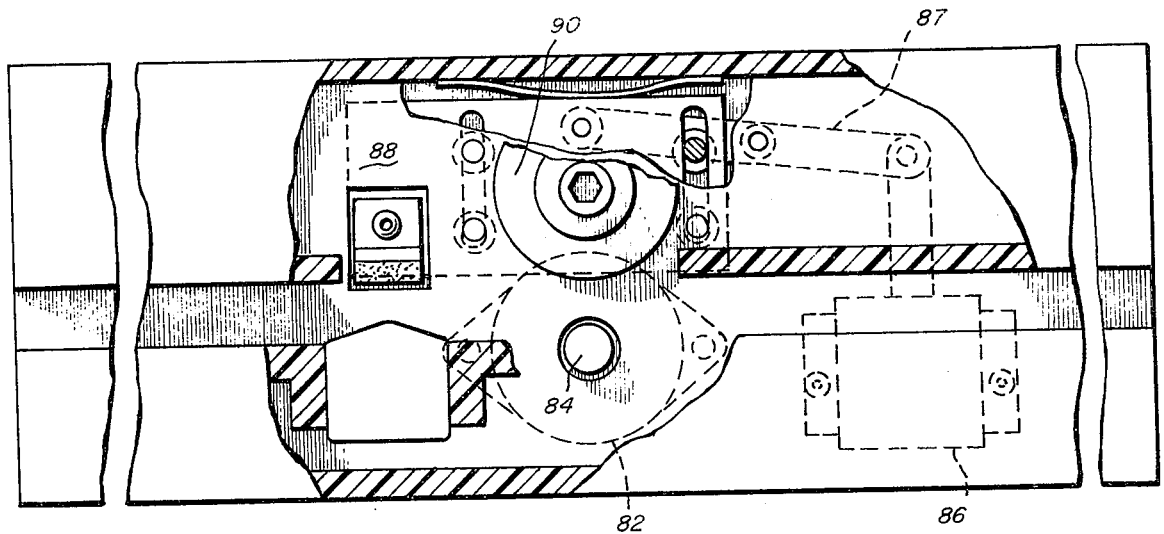
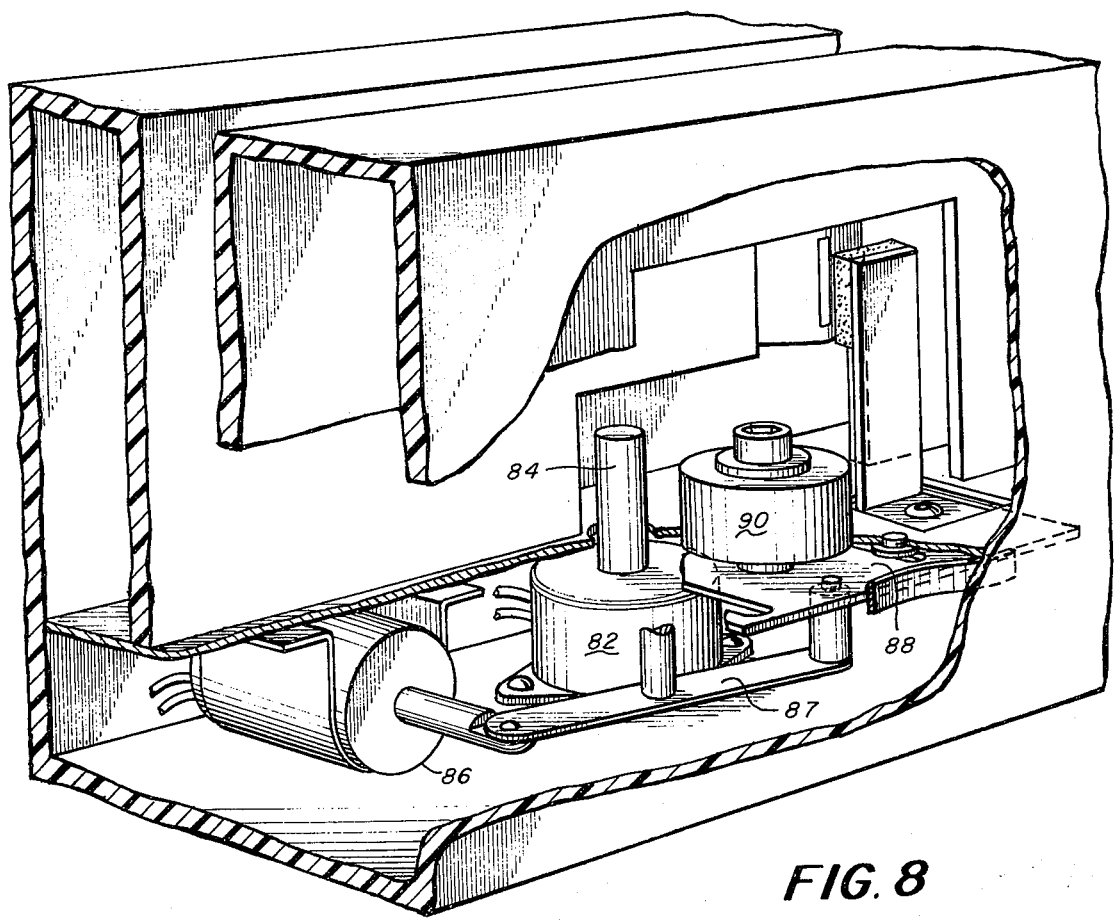
FIG. 8

COMBINATION CARD AND TAPE RECORDER

RELATED APPLICATIONS

This application is a continuation-in-part of application Ser. No. 297,947, now U.S. Pat. No. 3,852,817, filed Oct. 16, 1972, which is a continuation-in-part of application Ser. No. 273,441, now U.S. Pat. No. 3,860,961, filed July 20, 1972.

FIELD OF THE INVENTION

The present invention relates, in general, to a combination tape and card recorder and player. More particularly, the present invention is directed to a combination recorder and player having separate card and tape drive means. In my previous application Ser. No. 273,441, there is disclosed an adapter for a conventional tape recorder which permits the recorder to accept recording cards in place of the tape cassette. In my application Ser. No. 297,947, there is disclosed a combination card and tape player wherein the tape cassette well is constructed to receive a card which is propelled by a card drive means selectably movable into the well. In both of these devices the tape cassettes and cards are essentially handled by the same reading mechanism, namely the record and play head. With this arrangement either a card or a tape cassette may be in operation but both may not be.

The present invention contemplates the use of separate tape and card drive means and separate tape and card read and record heads. In a fundamental embodiment of the present invention there is a cassette recorder-player having a card channel attached to the back thereof and further including means for transporting cards through the channel and a record-play-erase head positioned in the channel.

With the arrangement of the present invention selective tape and card drive can be provided. Functionally, this means that a student can listen to a tape, then switch to the card mode, play cards, and then switch back to the cassette or tape mode with the tape starting from where it was previously interrupted. Also, in accordance with the present invention, there can be provided a joint mode of operation wherein both tape and card operation occurs jointly. With this arrangement and using associated switching circuitry, it is possible to remove a message from the tape cassette and record it on the card.

Accordingly, one object of the present invention is to provide a combination cassette and card recorder-player having separate means for accommodating the cassette and card and wherein the cassette and card may be separately usable.

A further object of the present invention is to provide a combination recorder-player, as set forth in the preceeding object and that permits joint operation wherein information on the tape cassette can be transferred to the card and possibly vice-versa.

A further object of the present invention is to provide a recorder-player as set forth herein and that is provided with selective individual drive means for the cassette and card.

SUMMARY OF THE INVENTION

To accomplish the foregoing and other objects, the present invention contemplates the use of separate means for accommodating the tape cassette and card with a recording medium associated therewith, rather than providing an adapter for insertion into the tape cassette well or the modification of the cassette well for receiving cards as is taught in my prior applications referred to hereinbefore. Thus, the audio recording and reproducing machine of this invention may typically comprise a housing having means defining a well for receiving a tape cassette and means for driving the tape in the cassette. The cassette receiving well is preferably positioned at the front of the machine and at the rear of the machine there is provided a guide channel having a track for a card to pass along. Means are also provided for driving the card. In accordance with one mode of operation of the present invention, there is provided a mode switch which has a card and a tape position. This mode switch switches the erase and record/play circuits from the cassette head to the card head and vice-versa. In this way, both a cassette and card could be in the machine but if the tape mode were selected then recording and playback could only be accomplished on the tape.

A further preferred feature that can be used in association with the mode switch is selective drive means. To provide this operation a mechanical linkage is associated with the mode switch and when in the card mode, for example, card drive is permitted but tape drive is inhibited. With this type of operation a student can listen to a tape, and then switch to the card mode, play cards, and switch back to the cassette mode with the cassette starting up from where it was previously stopped.

The device of the present invention also preferably may have another feature embodied therein in that the mode switch can actually have a third position other than the card and tape positions. This third position may be referred to as the joint position in which it is possible to take a message off the tape cassette and record it on the card. To accomplish this type of operation an information switching network is employed.

A further feature that can be embodied in the present invention is the use of a two track capability. These two tracks would include an instructor track and a student track with the instructor recorded track being protected from erasure.

BRIEF DESCRIPTION OF THE DRAWINGS

Numerous other objects features and advantages of the invention should now become apparent upon a reading of the following detailed description taken in conjunction with the accompanying drawings, in which:

FIG. 8 shows an alternate arrangement wherein a separate motor is used for the card drive; and FIG. 9 is a plan view of the card drive arrangement shown in FIG. 8.

DETAILED DESCRIPTION

Figure 1:
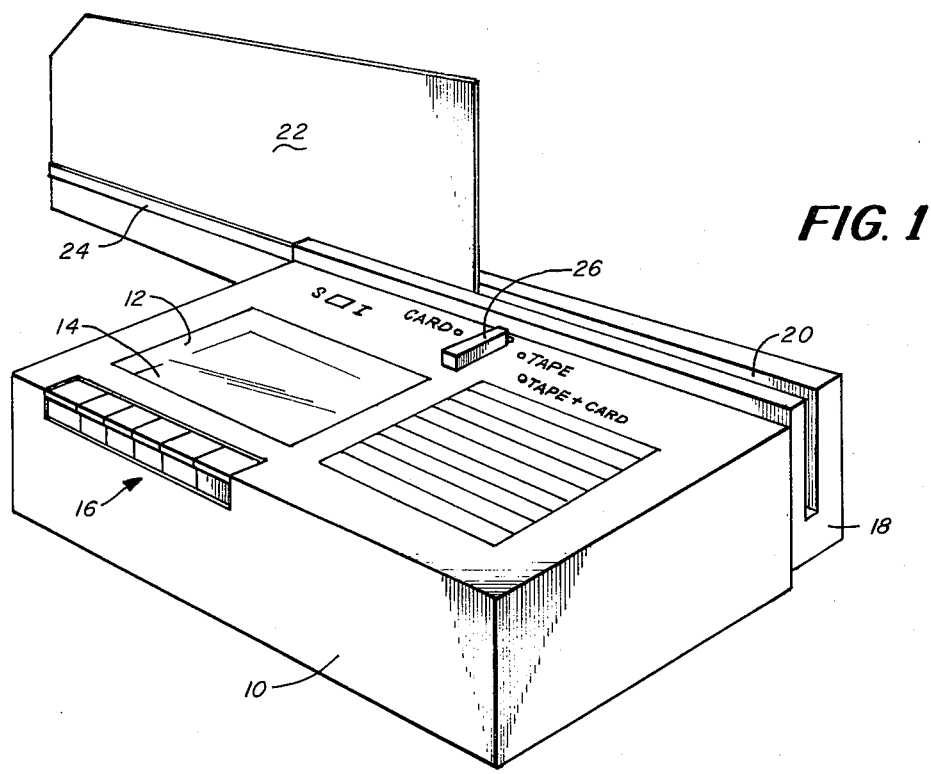
FIG. 1 is a perspective view of the machine of the present invention.

Referring now to the drawings and in particular to FIG. 1, there is shown a perspective view of a machine constructed in accordance with the principals of the present invention. This machine comprises a housing 10 for containing the electronics and various drive mechanisms of the present invention. The recording-reproducing machine shown in FIG. 1 may be of conventional design as far as the cassette portion of the machine is concerned. Accordingly, the machine includes a tape cassette well 12 for accommodating a tape cassette 14 and has a switch array 16 associated therewith. The buttons of the switch array 16 may include a rewind button, fast forward button, record button, play back button and stop button.

In accordance with the present invention there is preferably provided at the back of the player a U-shaped member 18 defining a guide channel 20 for accommodating a card 22 having a magnetic media 24 thereon. One or two recording tracks may be provided on the recording strip 24.

FIG. 1 also shows a pair of switches including switch 26 which is a mode switch for selecting either the card or tape mode of operation in this particular embodiment. Also shown in FIG. 1 is a slide switch 28 which is operable to select either the student or instructor track, if there are two such tracks on the recording strip 24.

For the embodiment shown in FIGS. 1–4, there is a record and play head associated with both the tape cassette 14 and the card 22. These heads are not shown in FIG. 1. The switch 26 may be connected so that in the card mode only the card head is connected to the record-play circuitry of the machine and similarly when the switch 26 is in the tape mode then only the tape head is connected to the record-play circuitry of the machine. In this embodiment, the drive for the card and tape is selective and when the mode switch is in the card mode of operation drive is not provided to the tape cassette and vice-versa.

Figure 2:
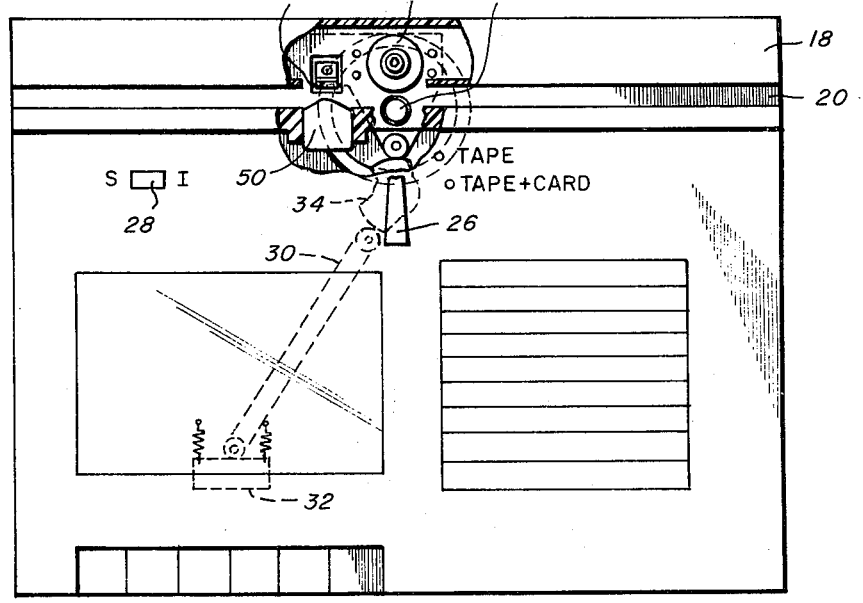
FIG. 2 is a plan view partially cut away of the machine of FIG. 1.

The concepts of the present invention can be practiced by modifying an existing tape recorder and player. In such a device, there is a record-play head which is not shown in the drawings of this application. There is also associated with the tape cassette a drive means such as a drive capstan and associated tape transport mechanism. FIG. 2 shows, in dotted, a linkage arm 30 which connects to the tape transport 32. The linkage arm 30 is operated from cam 34 which is associated with rotary switch 26, shown in FIGS. 3 and 4. In FIG. 2 the cam 34 is shown in its off position wherein neither card nor tape drive is provided. FIG. 5 shows the cam 34 in greater detail in its off position. The linkage arm 30, shown in FIG. 2, may couple to a sliding bar of the tape transport 32 and may operate the tape transport 32 in a similar manner to the way it is normally operated in a conventional machine via the switch array of the machine.

Figure 3:
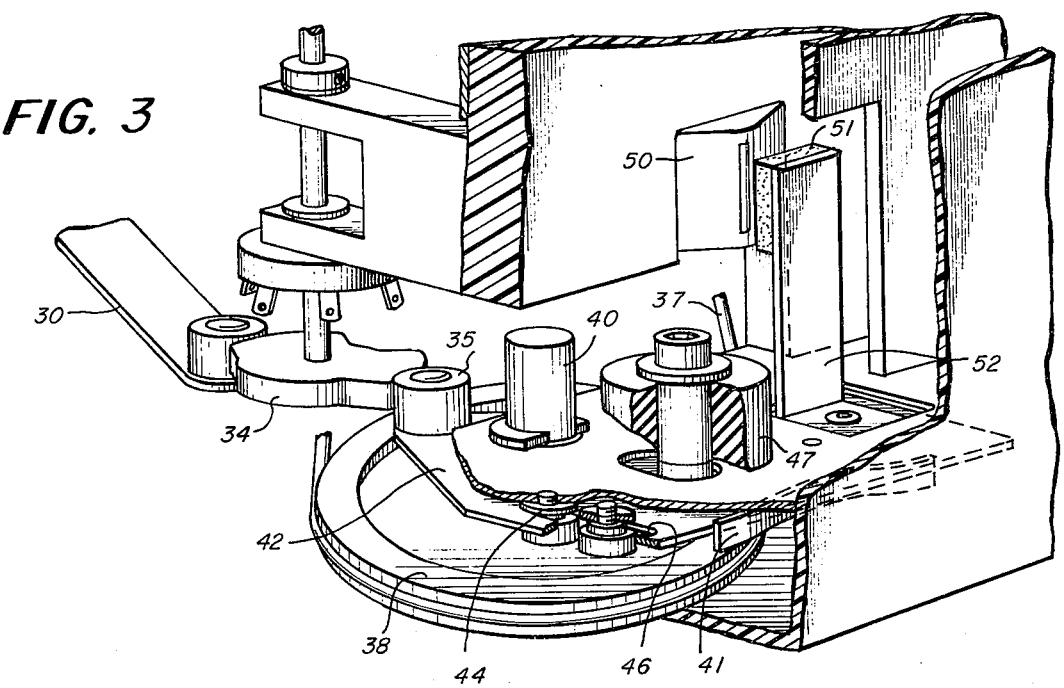
FIG. 3 is a perspective view showing in detail the card drive means shown in FIG. 2.

The conventional recorder-player is also provided with a motor drive. The output from this motor may also couple by way of belt 37 to the flywheel 38 for providing drive to the capstan 40. The drive capstan 40 is positioned on one side of the guide channel 20 for the card. The transport mechanism associated with the card includes a plate 42 which is guided by means of slides 44 extending through an aperture 46. An idler capstan 47 is supported on plate 42 and in the position shown in FIG. 3 is urged away from capstan 40 so that there is no card drive even though the capstan 40 is being rotated. When the switch 26 is moved to the card position, the cam 34 is rotated and the cam follower 35 is urged to the left in FIG. 3 by spring 41 so that the idler capstan 47 may now move towards the drive capstan 40. When a card is inserted therebetween then the card can be driven.

The card transducer head 50 is also shown and has associated therewith a pressure pad 51 which is supported from a spring steel pressure pad arm 52 which is fastened at its bottom end to plate 42 so that as the plate 42 is moved into its card drive position, the pressure pad contacts the card on the opposite side to the transducer 50.

Figure 4:
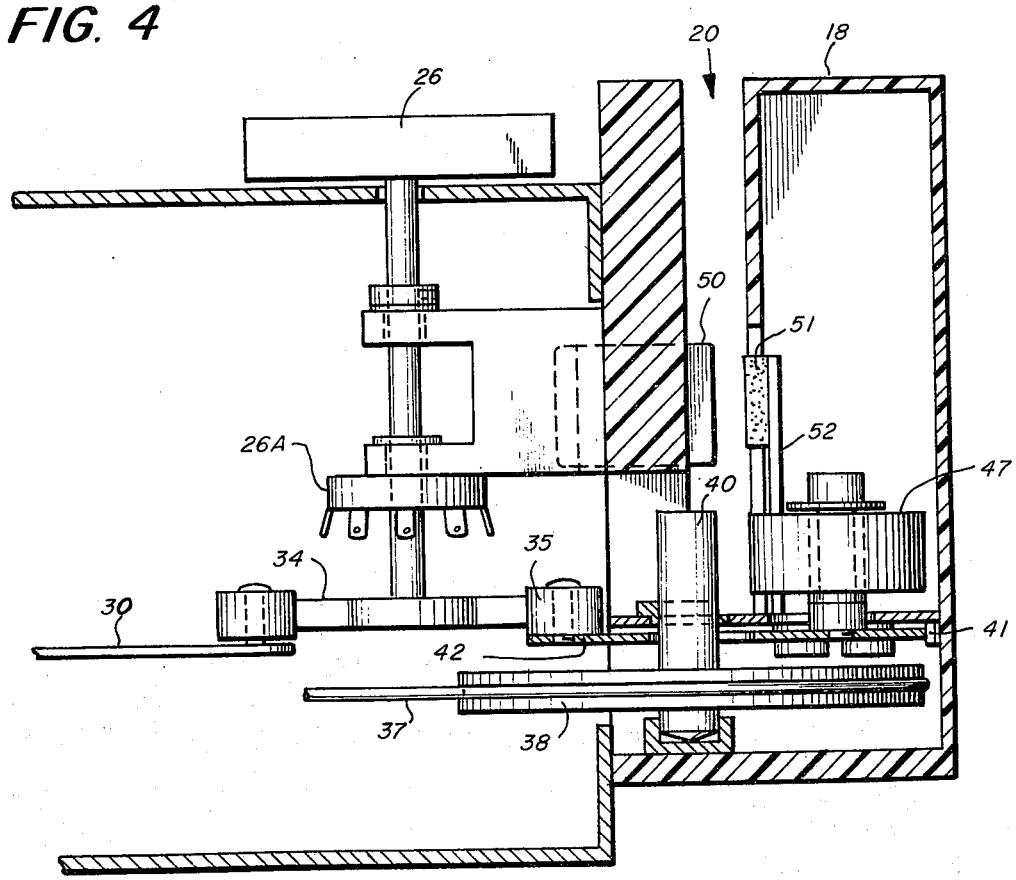
FIG. 4 is a side view of the card drive means shown in FIGS. 2 and 3.
Figure 5:
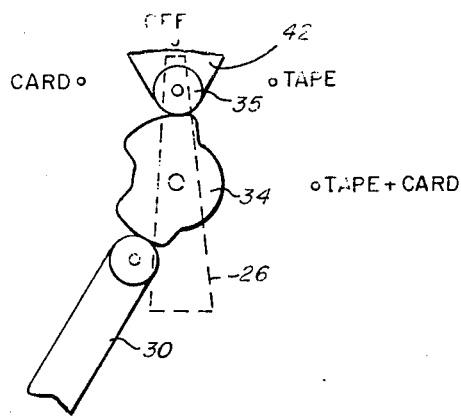
FIG. 5 shows the mode switch and associated cam for providing the different modes of operation.

As depicted in FIGS. 3 and 4, the switch 26 also has a bottom switch contact portion 26A which provides different switch closures and openings depending upon the position of the mode switch 26. The operation of switch portion 26A will be discussed hereinafter with reference to FIG. 7.

Figure 6:
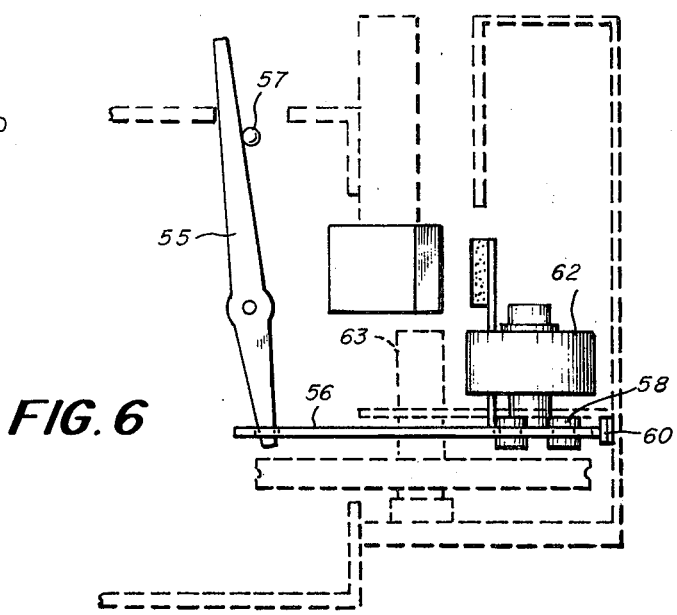
FIG. 6 shows an alternate arrangement for operating the card transport.

FIG. 6 shows an alternate arrangement that can be substituted in this invention. FIG. 6 shows, in phantom, the portions of the apparatus identical to that shown in FIG. 4. With this arrangement the mode switch may be purely electrical and not have a cam associated therewith. In FIG. 6, the lever 55 is operable to enable the card transport mechanism. The lever 55 may connect at its bottom end to a sliding plate 56 which is similar to the plate 42 shown in FIG. 3. A pair of slides 58 guide the plate 56 and a spring 60 biases the plate 56 toward the left in FIG. 6. When the lever 55 is moved to the alternate position shown in FIG. 6, then the plate 56 moves to the left and the idler capstan 62 is moved into driving contact with the drive capstan 63. With the arrangement shown in FIG. 6, the cassette portion of the machine can be operated in a normal manner through the switch button array, such as the one shown in FIG. 1, and the cards can be selectably operated via the lever 55. The mode switch is also operable in this embodiment to switch between the card and tape modes. In FIG. 6 the lever 55 may have a detent means 57 associated therewith for holding the lever in either position.

As previously mentioned, it is desired that there be essentially three modes of operation. As indicated in FIG. 5, a cam arrangement can be provided so that the drive of both the card and tape occurs concurrently. In this embodiment, it is also preferred that in this position with both drives being provided that a further capability be provided of taking a message from the tape cassette and recording it on the card. The schematic block diagram of FIG. 7 shows one arrangement for accomplishing this.

Figure 7:
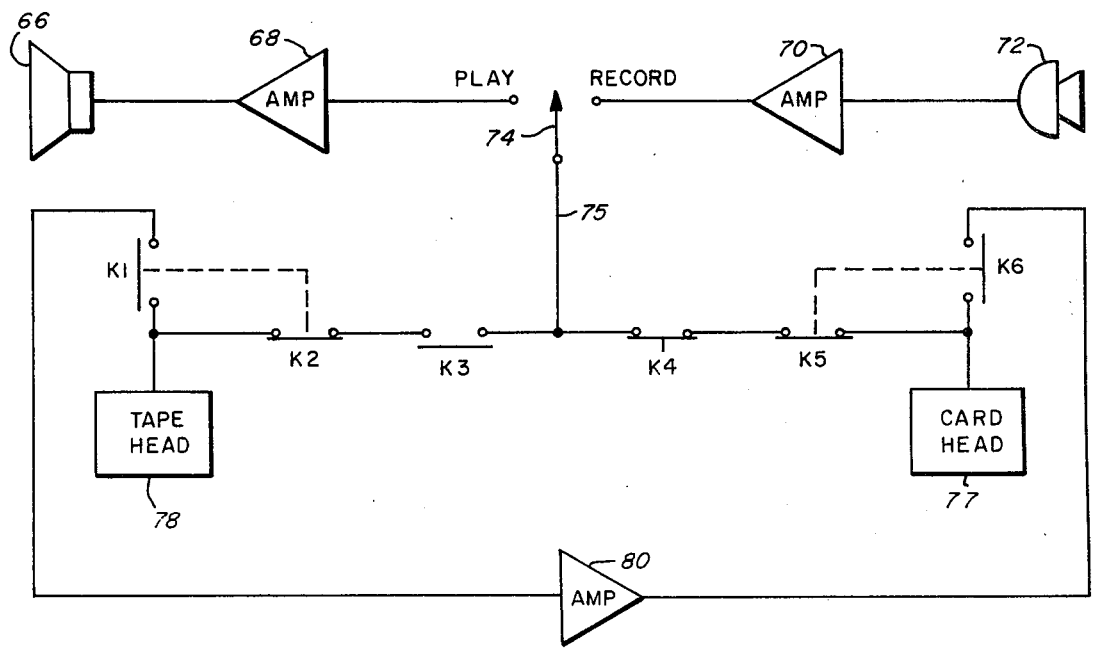
FIG. 7 is a schematic circuit diagram associated with one machine constructed in accordance with this invention.

FIG. 7 shows a part of a conventional record-playback circuit including a speaker 66 which receives an audio signal by way of amplifier 68, and an amplifier 70 amplifies the signal from microphone 72. To provide the play and record modes of operation there is provided a switch 74 which in the record mode couples the output from amplifier 70 to line 75. In the play mode, line 75 is coupled to the input of amplifier 68. The switch 74, shown in FIG. 7, is primarily only for the purpose of illustration and in an actual embodiment the switching is provided by the button array, such as the one shown in FIG. 1.

FIG. 7 also shows the card head 77 and the tape head 78. The switch contacts, shown in FIG. 7, are associated with the electrical switching portion of mode switch 26. These different contacts include contacts K1, K2, K3, K4, K5 and K6. The contacts K3 and K4 are operated by rotation of the mode switch to its different positions. When the mode switch is in the tape position contact K3 is closed and contact K4 is open. Similarly, when the mode switch is in the card position, the contact K4 is closed and the contact K3 is open. The inclusion of contacts K3 and K4 assure that in the tape mode only the tape is in operation and in the card mode only the card is in operation. The contacts K3 and K4 may actually simply be micro-switches that are operated to close only in predetermined positions of the mode switch.

FIG. 7 also shows contacts K1 and K2 which are ganged together and operate together. Similarly, there are provided contacts K5 and K6 which are ganged together and operate in unison. These contact pairs operate so that when the mode switch is in either the tape or card position but not the "both" position, then the contacts K2 and K5 are closed and the contacts K1 and K6 are open, as shown in FIG. 7. Thus, if for example, the switch 74 is in the record mode and the mode switch is in the card mode then the contacts K4 and K5 are closed as shown in FIG. 7 and recording occurs via the microphone 72, amplifier 70, line 75, contacts K4 and K5 and the card head 77.

When the mode switch is in the both position then the contacts K2 and K5 are open and the contacts K1 and K6 close. With the contacts K2 and K5 open, then there can be no operation by way of line 75 regardless of whether the switch 74 is in the play or record mode. However, in this position, a path is provided so that signals from the tape head 78 can be conveyed by way of contact K1, amplifier 80, and contact K6 to the card head 77. As previously indicated in this position the switch 36 is causing drive for both the tape and card and thus a message that is on the tape can be conveyed by way of amplifier 80 to the card head for causing recording of that message on the card.

The contacts shown in FIG. 7, namely contacts K1–K6, may all be associated with the switch 26 such as the one shown in FIG. 3. The provision for these contacts that operate in different positions of the switch is a well known technique once given the teachings shown in FIG. 7. Similarly, each of the contacts could be a micro-switch that is operated in different predetermined positions of the switch 36. The tape and card head may be of conventional design and also the amplifiers shown in FIG. 7 may be of conventional design.

FIGS. 8 and 9 show another embodiment of the present invention. With this embodiment, rather than having a mechanical connection between the tape recorder drive mechanism and the card transport, there is provided a separate electric motor 82. The motor 82 has the capstan 84 extending therefrom and as shown in FIGS. 8 and 9, there may also be included a solenoid 86 which couples via linkage 87 to the card transport mechanism 88 for moving the idler capstan 90 toward and away from the drive capstan 84.

The arrangement shown in FIGS. 8 and 9 is most advantageous in that a conventional design for a tape player can be easily modified with the addition of the motor 82 and associated drive mechanism, as shown in FIGS. 8 and 9, to convert the tape player to a combination tape and card player. The only connection between the tape player is electrical and there is no mechanical linkage as shown in the previous embodiments. With this arrangement a mode switch similar to switch 26, shown hereinbefore, can be used and in the card position or in the both position the solenoid 86 is energized to cause card driving. An electrical setup like that shown in FIG. 7 can also be used with the embodiment of FIGS. 8 and 9 with possibly one of the contacts K1–K6 being used for the control of solenoid 86.

What is claimed is:

1. An audio recording and reproducing machine capable of handling a tape cassette and card having a magnetic media associated therewith comprising;
   a housing having a well for receiving the tape cassette and a member spaced from the well and defining a guide channel having a track for said card to pass along,
   mode switch means having a card position, a card and tape position and a tape position,
   transport means in the well for driving the tape in the cassette,
   cam means connected to said mode switch means and operable therewith to selectively assume either a card position, a card and tape position or a tape position, respectively,
   cam follower means contacting said cam means and responsive to operation of the mode switch means to either its tape position or its card and tape position for enabling operation of only the transport means,
   drive means adjacent the guide channel for propelling the card through the channel and including a drive capstan and an idler capstan,
   means for slidably supporting the idler capstan and including cam follower means contacting said cam means and responsive to operation of the mode switch means to either its card position or its card and tape position for enabling operation of only the drive means by urging the idler capstan toward the drive capstan,
   and motor means including means coupling directly to the drive capstan for rotating the drive capstan in all three positions of the mode switch means.

2. A machine as set forth in claim 1 wherein said motor means comprises only one drive motor continuously operated in all three positions of the mode switch means and wherein said transport means and card drive means are selectively operated in dependence upon the position of the cam means.

3. A machine as set forth in claim 1 wherein said means for slidably supporting the idler capstan includes a support plate having the cam follower means at one end and means for supporting the idler capstan at another end.

4. A machine as set forth in claim 3 including means for biasing the support plate toward the cam means and a fixed plate disposed above the support plate and having a hole for receiving the drive capstan which extends above the fixed plate and an elongated slot through which the idler capstan extends.

5. A machine as set forth in claim 4 wherein said support plate also has an elongated slot extending in the same direction as the slot in the fixed plate for accommodating the drive capstan.

6. A machine as set forth in claim 5 including means for supporting the support plate from the fixed plate including a slot in one of said plates and slide members fixed to the other one of said plates and moving in the slot.

7. A machine as set forth in claim 6 wherein said biasing means includes a spring bar contacting an edge of the support plate.

8. A machine as set forth in claim 7 wherein said means for rotating the drive capstan includes a belt and support pulley.

9. A machine as set forth in claim 8 wherein said motor means comprises only one drive motor continuously operated in all three positions of the mode switch means and wherein said transport means and card drive means are selectively operated in dependence upon the position of the cam means.

* * * * *